(12) United States Patent  (10) Patent No.: US 8,118,151 B1
Jesse  (45) Date of Patent: Feb. 21, 2012

(54) GRAIN AUGER MOVER

(76) Inventor: Lynn Jesse, Urbandale, IA (US)

( * ) Notice: Subject to any disclaimer, the term of this patent is extended or adjusted under 35 U.S.C. 154(b) by 0 days.

(21) Appl. No.: 12/930,537

(22) Filed: Jan. 10, 2011

(51) Int. Cl.
 *B65G 21/00* (2006.01)
(52) U.S. Cl. .................... 198/315; 180/16; 280/767
(58) Field of Classification Search ........... 198/300, 198/313, 315; 280/767; 180/16, 19.1; 414/326, 414/523
 See application file for complete search history.

(56) References Cited

U.S. PATENT DOCUMENTS

| | | | |
|---|---|---|---|
| 3,371,768 A * | 3/1968 | Oury et al. | 198/315 |
| 4,074,802 A * | 2/1978 | Hudis | 198/315 |
| 4,271,919 A * | 6/1981 | Vaughan | 180/16 |
| 4,351,428 A | 9/1982 | Long | |
| 4,359,117 A * | 11/1982 | Vaughan | 180/16 |
| 4,603,775 A | 8/1986 | Plett | |
| 4,714,149 A | 12/1987 | Tiede | |
| 4,963,066 A | 10/1990 | Boppart | |
| 5,044,867 A * | 9/1991 | Pettijohn | 198/315 |
| 5,318,444 A * | 6/1994 | Kuzub et al. | 198/315 |
| 7,178,615 B1 * | 2/2007 | Smollock et al. | 180/19.1 |
| 7,191,889 B1 | 3/2007 | Heley | |
| 7,708,131 B2 | 5/2010 | Muth | |
| 7,793,770 B1 * | 9/2010 | Schoonover et al. | 198/312 |
| 7,866,456 B2 * | 1/2011 | Bauman et al. | 198/311 |

OTHER PUBLICATIONS

Brandt Augers, Brandt Agricultural Products Ltd., Po Box 317, Station Main, 13th Ave & Pinkie Rd., Regina, SK, Canada S4P 3A1; sales literature, 6 pages.

* cited by examiner

*Primary Examiner* — James R Bidwell
(74) *Attorney, Agent, or Firm* — Dennis L. Thomte; Thomte Patent Law Office LLC

(57) ABSTRACT

A grain auger mover assembly is disclosed which may be used to move either a conventional grain auger or a grain auger having a swing hopper auger associated therewith. The grain auger mover of this invention is remotely controlled.

12 Claims, 9 Drawing Sheets

GRAIN AUGER MOVER

BACKGROUND OF THE INVENTION

1. Field of the Invention

This invention relates to a grain auger mover and more particularly to a remotely controlled mover which may be used to move a conventional grain auger and which may also be used to move a swing hopper auger with respect to a main auger.

2. Description of the Related Art

Conventional grain augers include an elongated auger tube, having upper and lower ends, with a screw auger rotatably mounted therein. The conventional grain auger is usually supported by a pair of wheels having an adjustable framework connecting them to the auger tube so that the upper discharge end of the grain auger may be raised and lowered with respect to the lower intake end thereof. When it is necessary to move the grain auger between grain bins or the like, the lower end of the grain auger must be manually raised from its operative grain augering position so that the grain auger may be moved to the desired location. The grain augers are very heavy and are difficult to manually move.

A second type of grain auger which is commonly used to auger grain is referred to as a swing or truck hopper grain auger or simply a swing auger. The conventional swing augers normally include a wheel-supported main auger having upper and lower ends. A ground engaging swing hopper assembly is operatively pivotally connected to the main auger so that the swing hopper may be selectively pivotally moved with respect to the main auger so that the swing hopper may be operatively positioned with respect to a grain truck or the like. The swing hopper augers are very heavy and are difficult to manually move.

Although movers have been previously provided for moving swing hoppers, and movers have been provided for moving conventional grain augers, it is not believed that movers have been previously provided which may be used to move both conventional grain augers and swing hoppers. It is also believed that the prior art movers for grain augers and swing augers are generally driven by hydraulic motors which are connected to a tractor hydraulic system. This arrangement requires that the tractor be running to power the hydraulic system.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A first embodiment of the auger mover of this invention is adapted to be connected to the auger tube of a conventional grain auger to move the same. A second embodiment of this invention is adapted to be connected to the swing auger tube of a swing auger to move the same. The first embodiment of this invention includes an elongated upstanding main support having an upper end, a lower end, a first end, a second end, a first side and a second side. A horizontally disposed first axle is secured to the main support at the first end thereof adjacent the lower end thereof at the first side thereof. The first axle extends transversely from the main support and has a first drive wheel rotatably mounted thereon. A horizontally disposed second elongated axle is secured to the main support at the second end thereof adjacent the lower end thereof at the first side thereof. The second axle extends transversely from the main support and has a second drive wheel rotatably mounted thereon. A remote controlled reversibly electric drive motor is mounted on the main support which drives the first and second drive wheels in first and second directions with respect to the main support. First and second longitudinally extending collars are secured to the upper end of the main support in a horizontally spaced-apart manner.

A first bracket, having an upper inner end and a lower outer end is provided with the lower outer end of the first bracket being positioned outwardly and below the upper inner end of the first bracket. The upper inner end of the first bracket is selectively removably secured to the main support adjacent the upper end thereof at the second side thereof intermediate the first and second ends thereof. The lower outer end of the first bracket is selectively removably secured to the main support at the second side thereof. A third axle is secured to the lower outer end of the first bracket which is parallel to the first and second axles. A support wheel is freely rotatably mounted on the third axle and is selectively removably mounted thereon. A hitch ball is secured to the upper end of the first bracket and has a hitch ball coupler selectively removably mounted thereon. The mover also includes an elongated support arm having upper and lower ends with the lower end of the support arm fixed to the hitch ball coupler and extending upwardly therefrom. A first tube clamp is selectively pivotally secured, about a horizontal axis to the upper end of the support arm. A length adjustable jack has its lower end secured to the hitch ball coupler so that the jack extends upwardly therefrom. A second tube clamp is secured to the upper end of the jack. The first and second clamps are adapted to be selectively removably secured to the swing auger tube of the swing auger. An elongated steering handle is provided which has inner and outer ends with the inner end of the steering handle including a transversely disposed first sleeve which is adapted to be received between the first and second collars. A pivot pin extends through the first collar, first sleeve and the second collar. The steering handle is adapted to pivot the main support with respect to the lower end of the jack and the lower end of the support arm. The actuation of the electric motor causes the first and second drive wheels to move the first grain auger.

The second embodiment of the invention is adapted to be used with a swing auger by: (1) removing the support wheel from the third axle; (2) disconnecting the lower end of the jack from the coupler; (3) disconnecting the upper end of the jack from the second clamp; (4) disconnecting the coupler from the hitch ball; (5) connecting the lower end of the jack to the main support; (6) attaching a third clamp onto the swing hopper auger tube; (7) pivotally securing the upper end of the jack to the third clamp; and (8) securing the third clamp to the first and second collars of the main support.

It is therefore a principal object to provide an improved grain auger mover assembly.

A further object of the invention is to provide a grain auger mover assembly which may be used with either a conventional grain auger or with a swing auger having a swing hopper auger associated therewith.

A further object of the invention is to provide a remotely controlled and electrically driven grain auger mover assembly.

A further object of the invention is to provide a grain auger mover assembly which is easy and safe to use.

These and other objects will be apparent to those skilled in the art.

BRIEF DESCRIPTION OF THE DRAWINGS

Non-limiting and non-exhaustive embodiments of the present invention are described with reference to the follow

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
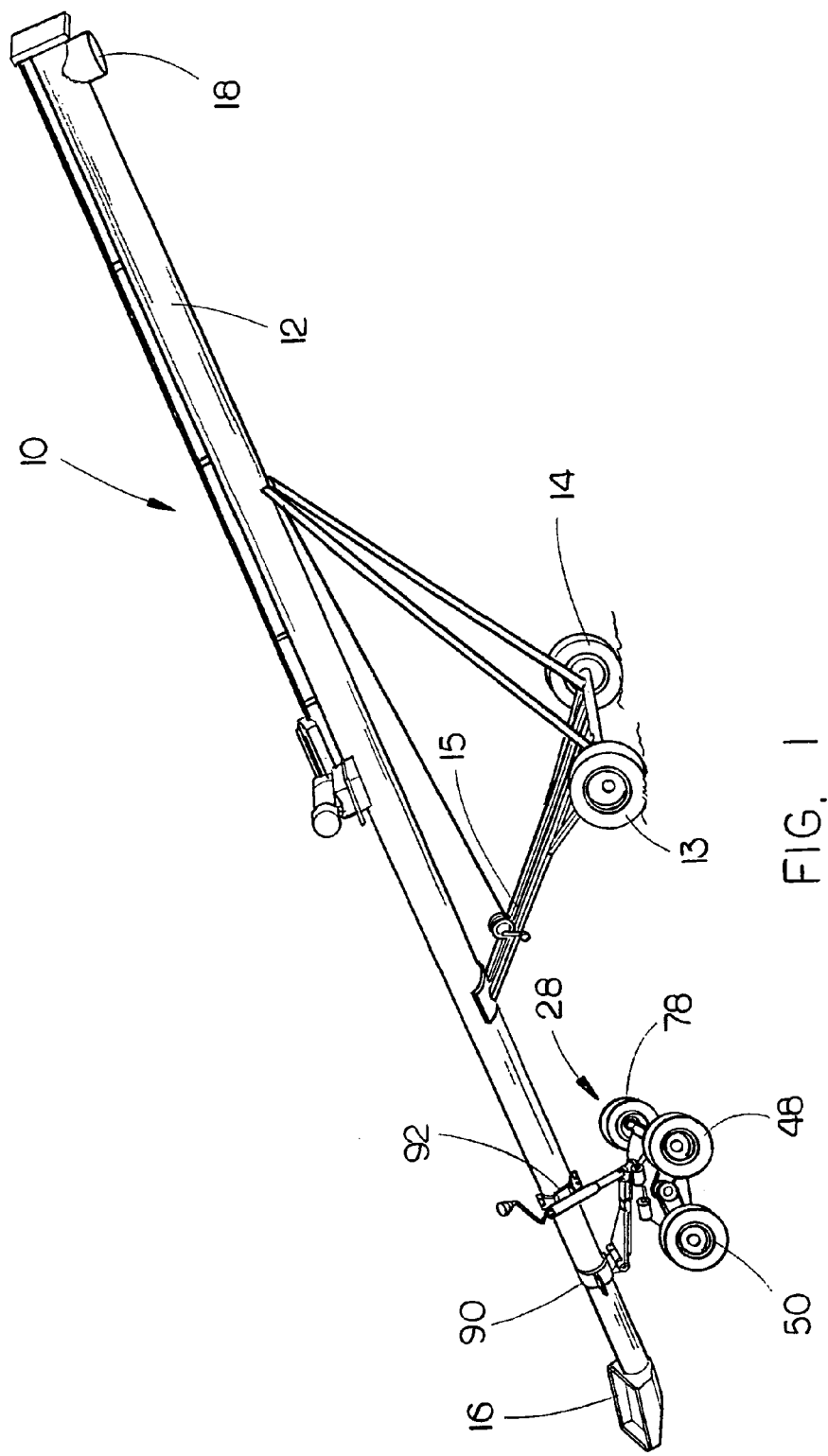
- FIG. 1 is a perspective view of a conventional grain auger having the first embodiment of this invention mounted thereon.
Figure 6:
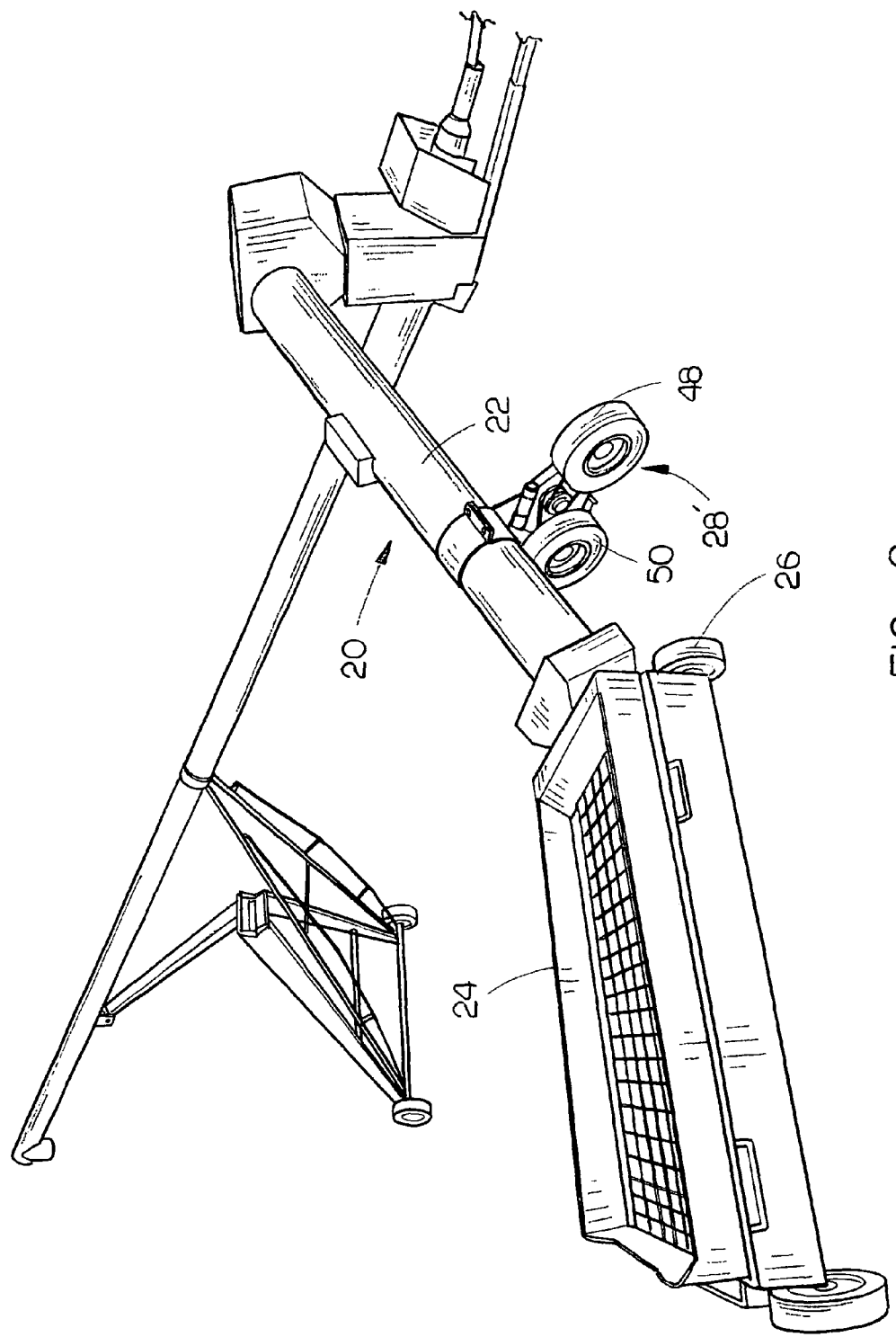
FIG. 6 is a perspective view of a swing auger having the second embodiment of this invention mounted on a swing auger.
Figure 7:
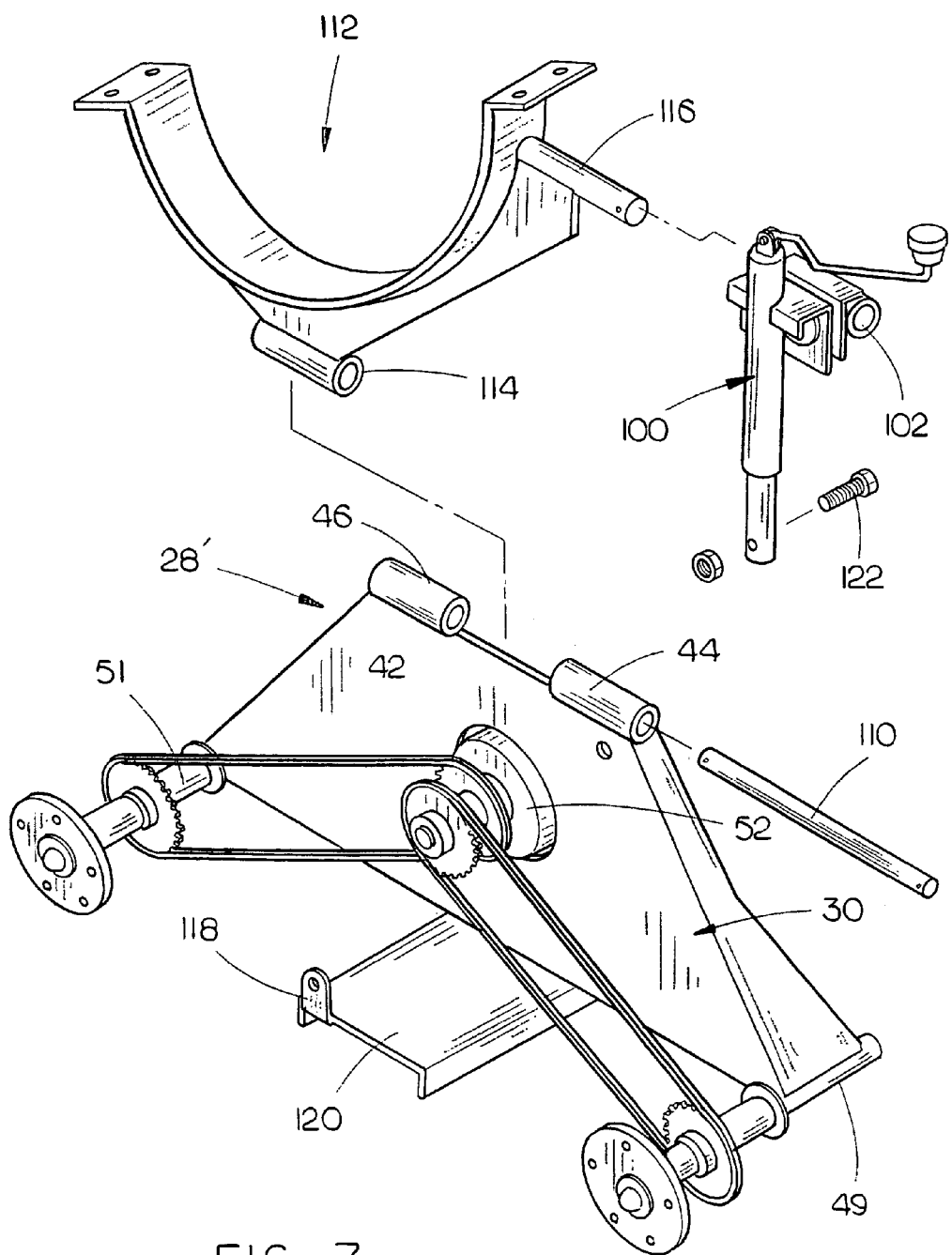
FIG. 7 is an exploded perspective view of the second embodiment of this invention.
Figure 8:
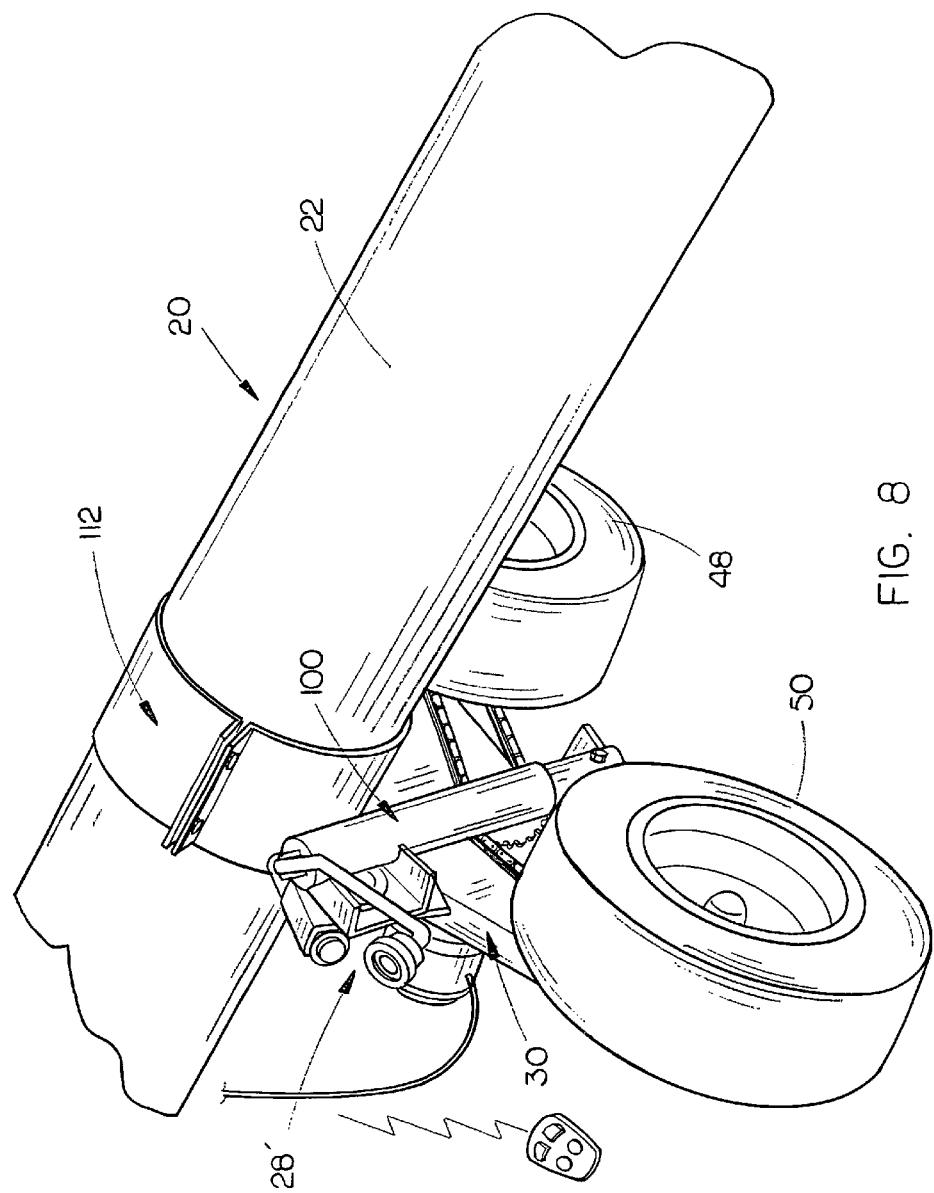
FIG. 8 is a perspective view of the second embodiment of this invention mounted on the swing auger of FIG. 5.
Figure 9:
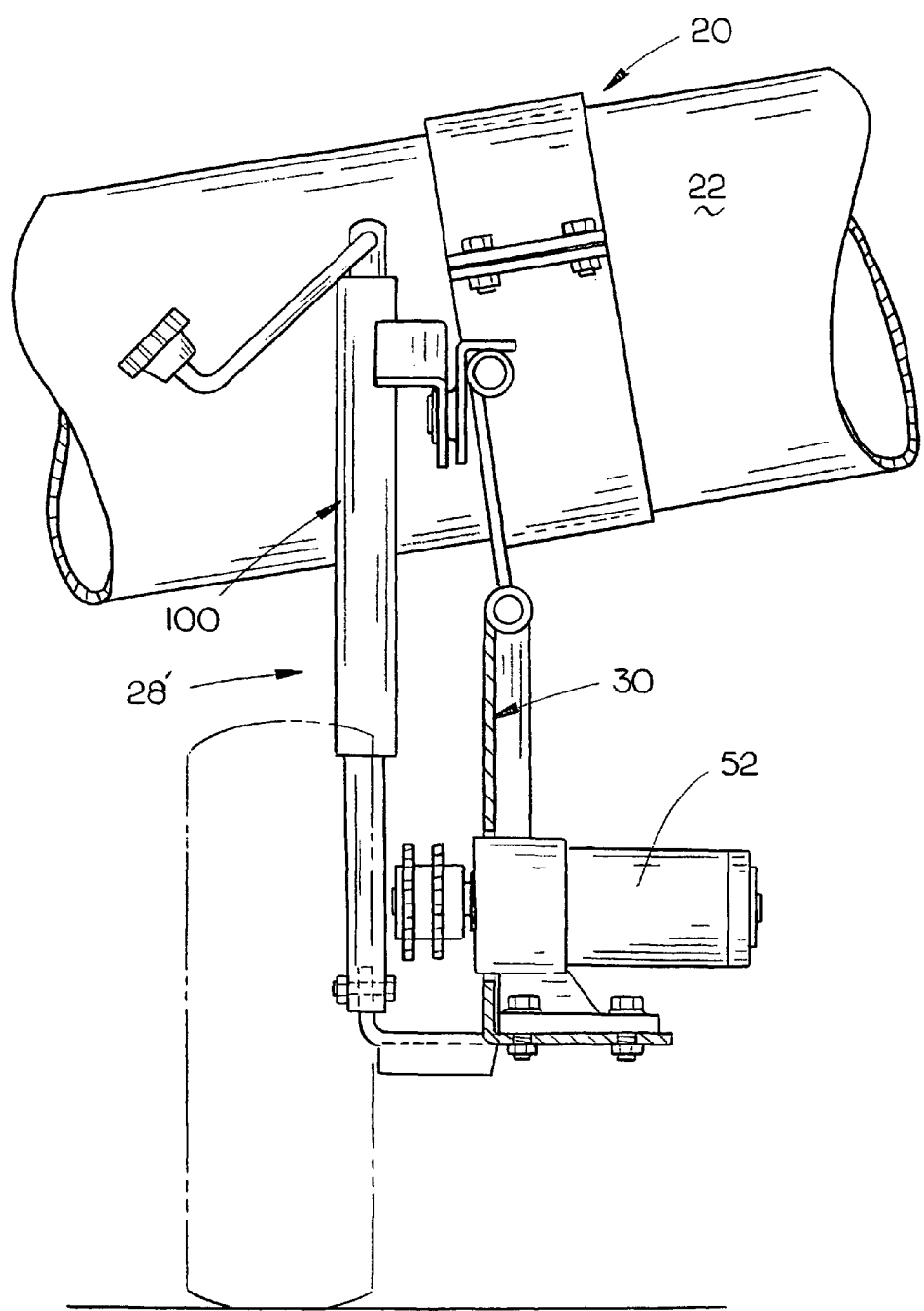
FIG. 9 is a side view of the second embodiment of this invention mounted on the swing auger of FIG. 5.

In FIG. 1, the numeral 10 refers to a conventional grain auger having an auger tube 12 supported on a wheels 13 and 14. Wheels 13 and 14 are operatively connected to auger tube 12 by an adjustable framework 15 so that the upper end of the grain auger 12 may be raised and lowered. Grain auger 10 has a lower grain intake end 16 and an upper grain discharge end 18 and has an auger rotatably mounted therein in conventional fashion. FIG. 6 illustrates a swing auger 20 having a pivotal swing auger tube 22 and a wheeled swing hopper 24. Swing hopper 24 includes wheels 26 for supporting the swing hopper 24 in conventional fashion. The swing auger 20, swing auger tube 22 and swing hopper 24 are of conventional design.

The numeral 28 refers to the first embodiment of a mover system which may be used to move the conventional grain auger 10.

The second embodiment of the invention is proved by removing certain components from the first embodiment as will be discussed in detail hereinafter. The second embodiment will be designated by the reference numeral 28'.

Figure 3:
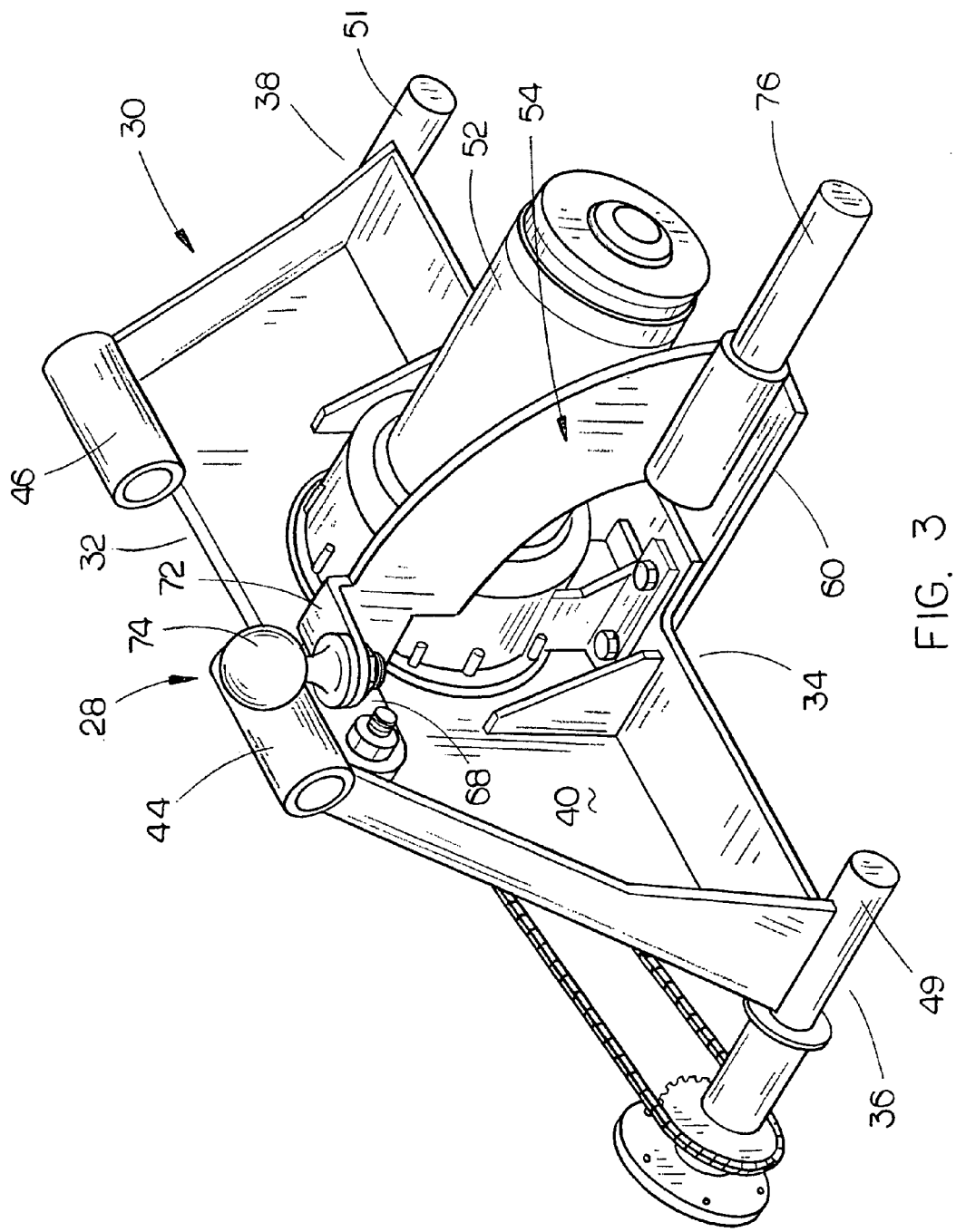
FIG. 3 is a perspective view of the first embodiment of this invention.

System 28 includes an upstanding support frame 30 having an upper end 32, lower end 34, first end 36, second end 38, first side 40 and second side 42. A pair of spaced-apart collars 44 and 46 are secured to the upper end 32 of support frame 30 as seen in FIG. 3. Drive wheels 48 and 50 are rotatably mounted on axles 49 and 51 at ends 36 and 38 of support frame 30 which are driven by an electrical motor 52 which is removably controlled either by radio or hard wires. Motor 52 is selectively reversible to drive the wheels 48 and 50. Motor 52 is connected to a source of 12 volt power.

Figure 2:
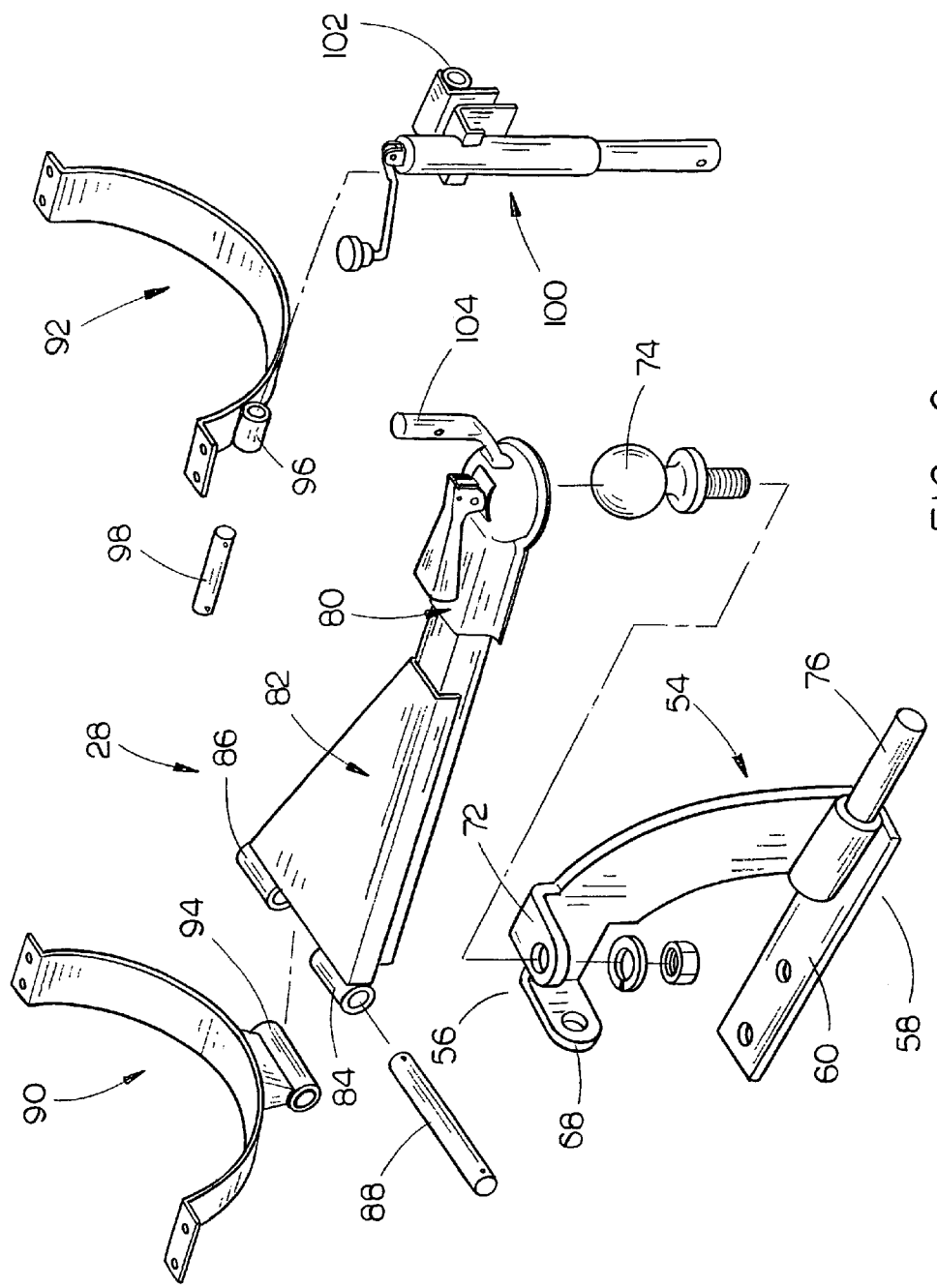
FIG. 2 is an exploded perspective view of the first embodiment of this invention.
Figure 4:
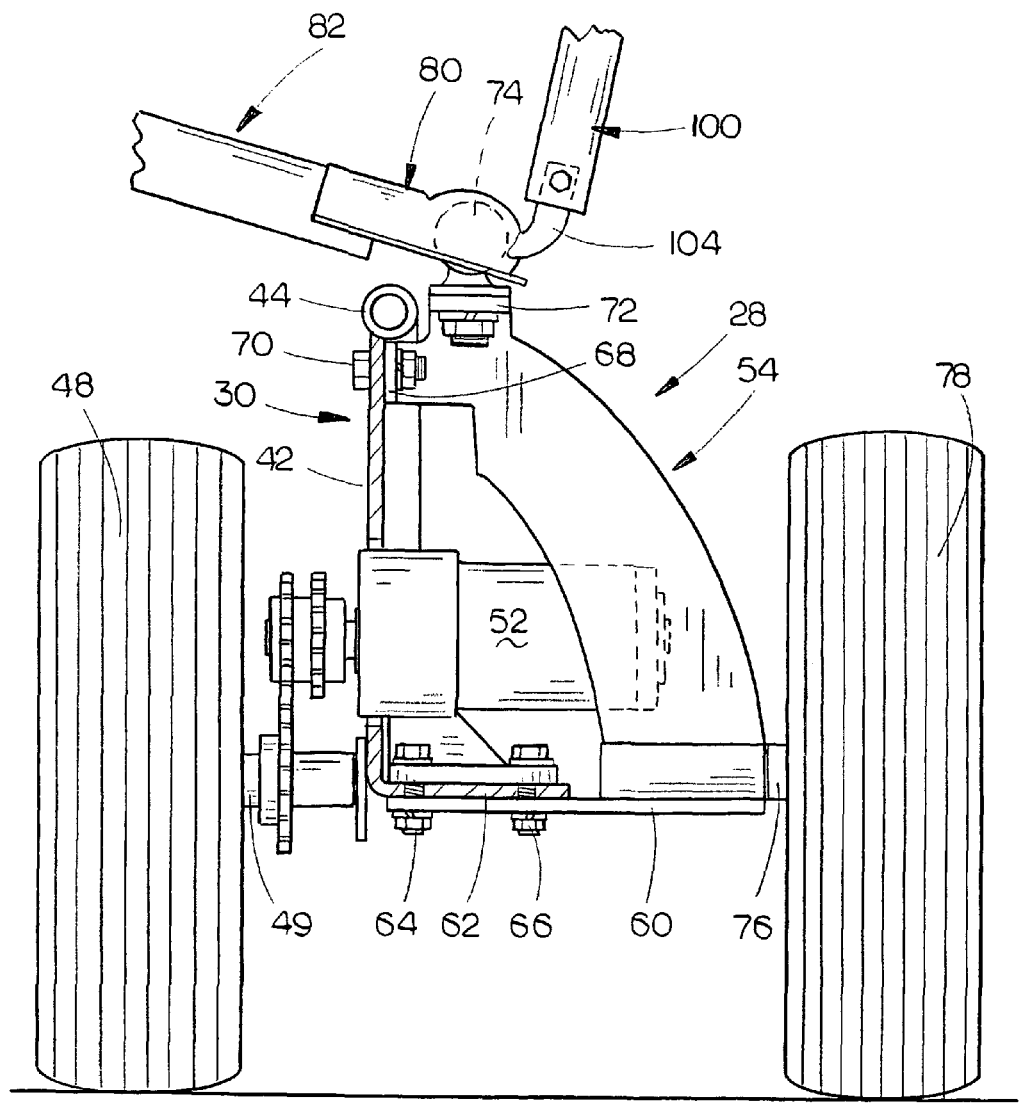
FIG. 4 is an end view of the first embodiment of this invention.

The numeral 54 refers to a bracket having an upper end 56 and a lower end 58. Bracket 54 includes a horizontally disposed bar or plate 60 at its lower end which extends inwardly therefrom. Plate 60 is bolted to the laterally extending portion 62 at the lower end of support frame 30 by bolts 64 and 66 (FIG. 4). The upper end of bracket 54 has an ear 68 extending therefrom which is bolted to support frame 30 by bolt 70. The upper end of bracket 54 also has a horizontally disposed ear 72 extending therefrom. Hitch ball 74 is mounted on ear 72 as seen in FIG. 2. Axle 76 extends from the lower end of bracket 54 (FIG. 2) and has a support wheel 78 freely rotatably mounted thereon in a selectively removable manner.

The numeral 80 refers to a conventional hitch ball coupler which is mounted on hitch ball 74. Support arm 82 is secured to coupler 80 and has a pair of spaced-apart collars 84 and 86 secured to the end thereof which are adapted to receive pivot pin 88 therein. Clamps 90 and 92 are clamped onto tube 12 of grain auger 10 (FIG. 1). The lower half of clamp 90 has a collar 94 secured thereto which is received between collars 84 and 86 with pin 88 extending therethrough. The lower half of clamp 92 has a collar 96 secured thereto which is adapted to receive pin 98 therein (FIG. 2).

Figure 5:
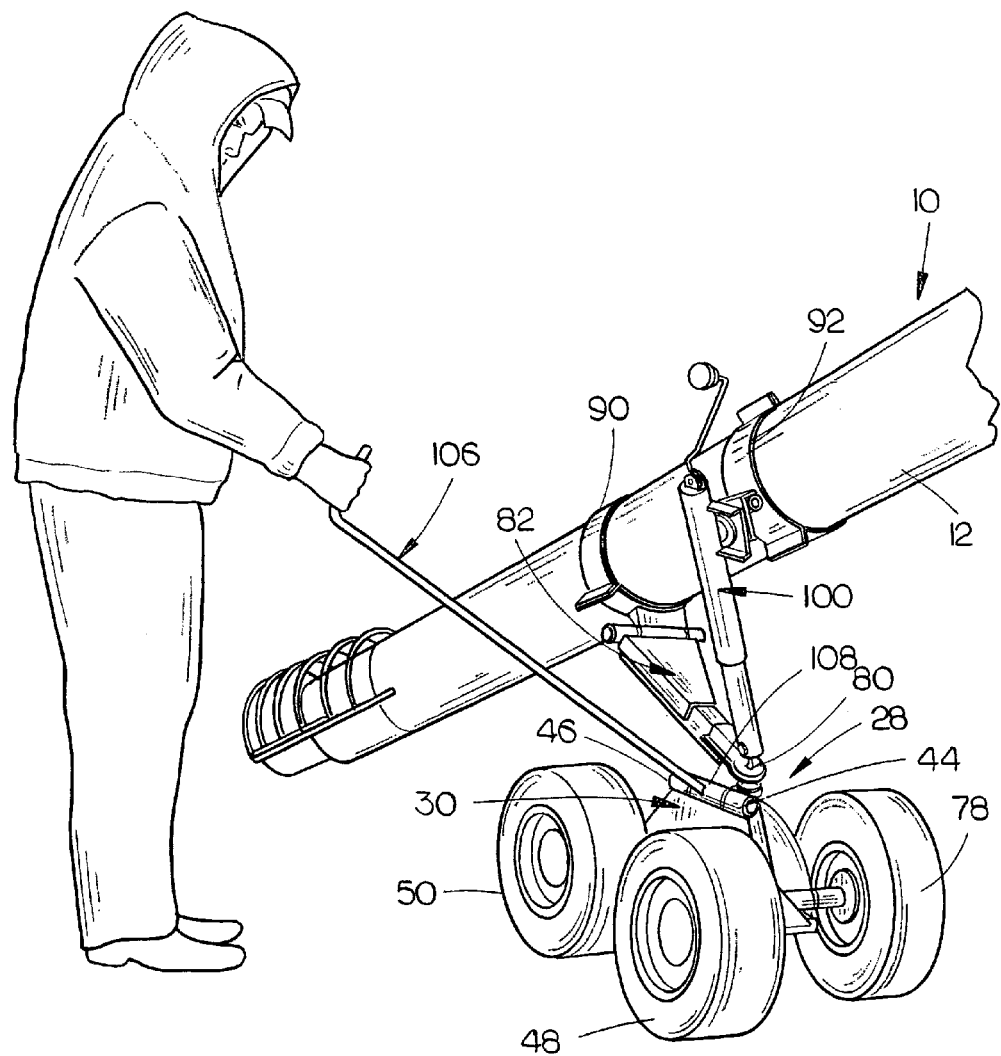
FIG. 5 is a partial perspective view illustrating the first embodiment of this invention mounted on the grain auger of FIG. 1.

The numeral 100 refers to an elongated jack of conventional design. Collar 102 is secured to the upper end of jack 100. Pin 98 extends through collar 96 and through collar 102 in a selectively removable fashion. The lower end of jack 100 is received on post 104 which is secured to coupler 80 and which extends upwardly therefrom. Jack 100 is maintained on post 104 by a suitable pin or key. In FIG. 5, the numeral 106 refers to a steering handle having a collar 108 at the end thereof which is adapted to be selectively removably and pivotally received between collars 44 and 46 at the upper end of support frame 30 and held therein by pin 110.

The operator may pivotally move the support frame 30 and wheels 48, 50 and 78 with respect to the tube 12 about hitch ball 74 to maneuver the grain auger 10 as the drive motor 52 is operated. The operator may control the operation of the drive motor 52 by remote control. The lower end of grain auger 10 may be raised or lowered by the jack 100. If the grain auger 10 is to be moved a considerable distance by a truck or tractor, the wheels 48, 50 and 78 may be raised out of ground engagement by way of jack 100.

The first embodiment of the system 28 may be easily and quickly converted or altered to function as a system 28' in one of two ways. In the first way, the following is accomplished: (1) steering handle 106 is disconnected from support frame 30 by removing pin 110 from collars 44, 46 and 108; (2) coupler 80 is disconnected from hitch ball 74; (3) the upper end of jack 100 is disconnected from collar 96 on clamp 92 by removing pin 98 from collar 102; (4) the lower end of jack 100 is disconnected from post 104: (5) jack 100 is set aside for use with system 28'; (6) wheel 78 is removed from axle 76; (7) a clamp 112 is provided with the lower half of clamp 112 having a sleeve 114 secured thereto and a shaft 116 secured thereto; (8) clamp 112 is clamped onto tube 22 of swing auger 20; (9) the support frame 30 with the drive wheels 48 and 50 attached thereto are maneuvered so that collars 44 and 46 are positioned opposite ends of collar 114 on clamp 112; (10) pin 110 is extended through collar 44, through collar 114 and through collar 46 and pinned therein; (11) collar 102 of jack 100 is mounted on shaft 116 and pinned thereon; (12) the lower end of jack 100 is bolted to ear 118 at the outer end of frame member 120, which is secured to support frame 36, by bolt 122. In the first way of converting system 28 to system 28', the bracket 54, hitch ball 74, plate 60 and axle 76 remain on the system and do not interfere with the operation of the system 28' in moving the swing auger 22. In the second way of converting the system 28 to system 28', the bracket 54 and related components are removed from support frame 30.

The activation of motor 52 on system 28' will cause the drive wheels 48 and 50 to pivotally swing or move the swing auger tube 22 with respect to the main tube of the grain auger 20 in an effortless manner.

Although the movers are shown and described as being used with grain augers, the movers could also be used with belt conveyors.

Thus it can be seen that the instant invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

I claim:

1. A mover for moving a grain auger including an auger tube, comprising:

an elongated and upstanding main support having an upper end, a lower end, a first end, a second end, a first side and a second side;

a horizontally disposed first elongated axle secured to said main support at said first end thereof adjacent the lower end thereof at said second side thereof;

said first axle extending transversely from said main support;

a first drive wheel rotatably mounted on said first axle;

a horizontally disposed second elongated axle secured to said main support at second end thereof adjacent the lower end thereof at said second side thereof;

said second axle extending transversely from said main support;

a second drive wheel rotatably mounted on said second axle;

a reversible electric drive motor mounted on said main support which drives said first and second drive wheels in first and second directions with respect to said main support;

first and second longitudinally extending collars secured to said upper end of said main support in a horizontally spaced-apart manner;

a first bracket having an upper end and a lower end;

said lower end of said first bracket being positioned outwardly and below said upper end of said first bracket;

said upper end of said first bracket being selectively removably secured to said main support adjacent said upper end thereof at said first side thereof intermediate said first and second ends thereof;

said lower end of said first bracket being selectively removably secured to said main support at said first side thereof;

a third axle secured to said lower end of said first bracket which is parallel to said first and second axles;

a support wheel freely rotatably mounted on said third axle;

said support wheel being selectively removably mounted on said third axle;

a hitch ball secured to said upper end of said first bracket;

a hitch ball coupler selectively removably mounted on said hitch ball;

an elongated support arm having first and second ends;

said support arm having its second end fixed to said hitch ball coupler and extending therefrom;

a first tube clamp selectively pivotally secured, about a horizontal axis, to said second end of said support arm;

a length adjustable jack having upper and lower ends;

said lower end of said jack being operatively secured to said hitch ball coupler;

and a second tube clamp secured to said upper end of said jack;

said first and second clamps adapted to be selectively removably secured to the auger tube;

an elongated steering handle having inner and outer ends;

said inner end of said steering handle including a transversely disposed first sleeve which is adapted to be received between said first and second collars;

and a pivot pin extending through said first collar, said first sleeve and said second collar;

said steering handle adapted to pivot said main support with respect to said lower end of said jack and said hitch ball coupler;

the actuation of said motor causing said first and second drive wheels to move the grain auger.

2. The mover of claim 1 wherein said drive motor is remotely controlled.

3. The mover of claim 1 wherein said lower end of said jack is pivotally secured to said hitch ball coupler.

4. The mover of claim 1 wherein said mover may be converted into a mover for a swing hopper auger including a swing hopper auger tube by: (1) removing said support wheel from said third axle; (2) disconnecting said lower end of said jack from said coupler; (3) disconnecting said upper end of said jack from said second clamp; (4) disconnecting said hitch ball coupler from said hitch ball; (5) connecting said lower end of said jack to said main support; (6) attaching a third clamp onto the swing hopper auger tube; (7) pivotally securing the upper end of said jack to said third clamp; and (8) securing said third clamp to said first and second collars of said main support.

5. The mover of claim 4 wherein said third clamp includes a second sleeve which is positioned between said first and second collars and wherein a pin is extended through said first collar, said second sleeve and through said second collar.

6. In combination with a first grain auger including an auger tube, and a second grain auger including a swing hopper auger having a swing hopper auger tube;

a grain auger mover assembly for use in moving either the first grain auger or the second grain auger, comprising:

an elongated and upstanding main support having an upper end, a lower end, a first end, a second end, a first side and a second side;

a horizontally disposed first elongated axle secured to said main support at said first end thereof adjacent the lower end thereof at said second side thereof;

said first axle extending transversely from said main support;

a first drive wheel rotatably mounted on said first axle;

a horizontally disposed second elongated axle secured to said main support at second end thereof adjacent the lower end thereof at said second side thereof;

said second axle extending transversely from said main support;

a second drive wheel rotatably mounted on said second axle;

a reversible electric drive motor mounted on said main support which drives said first and second drive wheels in first and second directions with respect to said main support;

first and second longitudinally extending collars secured to said upper end of said main support in a horizontally spaced-apart manner;

a first bracket having an upper end and a lower end;

said lower end of said first bracket being positioned outwardly and below said upper end of said first bracket;

said upper end of said first bracket being selectively removably secured to said main support adjacent said upper end thereof at said first side thereof intermediate said first and second ends thereof;

said lower end of said first bracket being selectively removably secured to said main support at said first side thereof;

a third axle secured to said lower end of said first bracket which is parallel to said first and second axles;

a support wheel freely rotatably mounted on said third axle;

said support wheel being selectively removably mounted on said third axle;

a hitch ball secured to said upper end of said first bracket;

a hitch ball coupler selectively removably mounted on said hitch ball;

an elongated support arm having upper and lower ends;

said support arm having its lower end fixed to said hitch ball coupler and extending therefrom;

a first tube clamp selectively pivotally secured, about a horizontal axis, to said upper end of said support arm;

a length adjustable jack having upper and lower ends;

said lower end of said jack being secured to said hitch ball coupler;

and a second tube clamp secured to said upper end of said jack;

said first and second clamps adapted to be selectively removably secured to the auger tube of the first grain auger;

an elongated steering handle having inner and outer ends;

said inner end of said steering handle including a transversely disposed first sleeve which is adapted to be received between said first and second collars;

and a pivot pin extending through said first collar, said first sleeve and said second collar;

said steering handle adapted to pivot said main support with respect to said lower end of said jack and said hitch ball;

the actuation of said motor causing said first and second drive wheels to move the first grain auger;

said grain auger mover assembly also being usable with the second grain auger by: (1) removing said support wheel from said third axle; (2) disconnecting said lower end of said jack from said coupler; (3) disconnecting said upper end of said jack from said second clamp; (4) disconnecting said hitch ball coupler from said hitch ball; (5) connecting said lower end of said jack to said main support; (6) attaching a third clamp onto the swing hopper auger tube; (7) pivotally securing the upper end of said jack to said third clamp; and (8) securing said third clamp to said first and second collars of said main support.

7. The combination of claim 6 wherein said third clamp includes a second sleeve which is positioned between said first and second collars and wherein a pin is extended through said first collar, said second sleeve and through said second collar.

8. The combination of claim 7 wherein said third clamp includes a pin with said upper end of said jack being pivotally secured to said pin of said third clamp.

9. The combination of claim 6 wherein said electric drive motor is remotely controlled.

10. The combination of claim 6 wherein said lower end of said jack is pivotally secured to said coupler when the mover assembly is being used to move the swing hopper auger.

11. The combination of claim 6 wherein said first bracket may also be removed from said main support when said mover is going to be used with the second grain auger.

12. The mover of claim 4 wherein said first bracket may also be removed from said main support when converting the mover for use with a swing hopper auger.

* * * * *